United States Patent [19]
Jammet

[11] 3,855,000
[45] Dec. 17, 1974

[54] AIR DEPOLARIZATION PRIMARY CELL AND PROCESS FOR PRODUCTION THEREOF

[75] Inventor: Jean Jammet, Poitiers, France

[73] Assignee: Saft-Societe Des Accumulateurs Fixes et de Traction, Ramainville, France

[22] Filed: Oct. 26, 1972

[21] Appl. No.: 300,907

[30] Foreign Application Priority Data
Oct. 29, 1971 France .................. 71.39027

[52] U.S. Cl. .................................. 136/86 A
[51] Int. Cl. .................................. H01m 29/04
[58] Field of Search ............. 136/86 A, 86 R, 83 R

[56] References Cited
UNITED STATES PATENTS

| | | |
|---|---|---|
| 2,830,109 | 4/1958 | Justi et al. .................. 136/86 A |
| 3,043,898 | 7/1962 | Miller et al. ................ 136/86 A |
| 3,126,302 | 3/1964 | Drushella .................... 136/86 R |
| 3,697,326 | 10/1972 | Jammet ...................... 136/86 A |
| 3,741,810 | 6/1973 | Dafler et al. ................ 136/86 A |
| 3,746,580 | 7/1973 | Aker et al. .................. 136/86 A |

Primary Examiner—Winston A. Douglas
Assistant Examiner—J. A. Feeley
Attorney, Agent, or Firm—Kenyon & Kenyon Reilly Carr & Chapin

[57] ABSTRACT

Air depolarization type electric cell comprising positive and negative electrodes and an electrolyte within a container. The said container is closed in fluid-tight manner. A free space within the container permits the expansion of the negative electrode without movement of the electrolyte. The process of manufacture of such cells is also recited.

23 Claims, 5 Drawing Figures

PATENTED DEC 17 1974 3,855,000

AIR DEPOLARIZATION PRIMARY CELL AND PROCESS FOR PRODUCTION THEREOF

RELATED APPLICATIONS

No related applications of applicant are co-pending.

BACKGROUND OF INVENTION

The invention relates to electric primary cells comprising, in a casing, a positive electrode, an alkaline electrolyte immobilized in the form of a gell, and a negative electrode based on pulverulent zinc.

In such primary cells, it is necessary above all to prevent any leakage of electrolyte from the casing, and also any inflow of air into the cell to contact the negative electrode, the result of which would be to chemically oxidize the latter. It is also necessary, for satisfactory functioning of the primary cells, to ensure close contact between the positive electrode and the electrolyte gel and the absence of bubbles within the latter.

These problems are difficult to solve and it is for this reason that the known primary cells utilize complex techniques involving a mode of assembly which is delicate and difficult to carry into effect on an industrial scale, whilst at the same time the results achieved are not fully satisfactory. Furthermore, the swelling of the negative active material normally accompanying discharge, when the electrolyte is alkaline, and which corresponds to an increase in volume of approximately 60 percent for complete discharge, introduces in these primary cells the hazard of short circuit by contact between the positive electrode and the negative electrode.

It is a purpose and feature of the present invention to remedy these disadvantages and to provide, additionally, a novel process for the assembly of an air-depolarization primary cell of great simplicity and reliability.

BRIEF SUMMARY OF INVENTION

The invention relates to an air-depolarization primary cell comprising a positive electrode, an immobilized alkaline electrolyte and a negative electrode based on zinc, these elements being disposed in a casing, characterized in that the casing is sealed in fluid-tight manner relative to liquids, on one side by the positive electrode and on the opposite side by a cover or lid carrying the negative terminal, and that a space for expansion of the negative electrode is provided in the casing between the said negative electrode and the cover or lid.

According to the invention, it is useful to provide means for constantly maintaining the negative electrode in a state of compression. Such means may comprise a compressible porous layer of a material, for example, a synthetic material, which is resistant to the electrolyte. The said means may also be a plate biased against the negative electrode by a spring, or by a piston frictionally slidable within the casing.

According to one embodiment of the invention, the positive electrode comprises a hydrophobic porous plate-like member adhesively secured along its periphery to the casing. The electrolyte in the cell is a solution of potassium hydroxide mixed with a gelling agent, such as starch. The negative electrode comprises a layer of pulverulent zinc, preferably in suspension in a gel.

The invention also pertains to a process for the manufacture of an air depolarization primary cell comprising notably disposing the positive electrode in a container, pouring the electrolyte in liquid form onto the positive electrode, covering the electrolyte with the negative electrode, and assembling the cover or lid with the container in fluid-tight manner. When the primary cell comprises means for compression of the negative electrode, the said means are positioned on the negative electrode before placing of the cover in position.

The adhesive attachment of the periphery of the positive electrode to the container affords a fluid-tight closure of the container with respect to the liquids therein.

The pouring of the electrolyte in liquid form onto the positive electrode results in the achievement of an electrolyte layer which is free from bubbles and whose abutting surface mates with facing surface of the positive electrode.

Due to the space provided for expansion of the negative electrode, the interface between the latter and the electrolyte is not displaced during discharge and any hazard of short circuit between the electrodes is thus eliminated.

Furthermore, the assembly process involving successively introducing the various layers or components constituting the primary cell is particularly simple and rapid and enhances production of such cells on an industrial scale.

Further objects and features of the invention will become apparent from the detailed description hereinafter set forth by way of example in conjunction with the accompanying drawings, wherein:

IN THE DRAWINGS

FIGS. 1, 2 and 3 respectively are views in longitudinal section of three embodiment of the invention; and FIGS. 4 and 5 are views in similar section of the primary cells shown respectively in FIGS. 1 and 2 illustrating their condition after discharge.

DETAILED DESCRIPTION OF INVENTION

Figure 1:
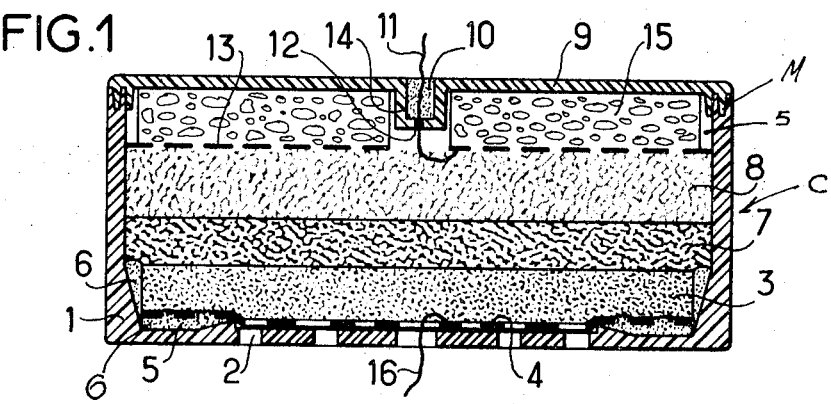

Referring first to FIG. 1, the primary cell C shown therein has a cylindrical container 1 made, for example, of polystyrene or other suitable plastic material. The bottom of this container 1 comprises a central zone provided with apertures 2. A positive electrode in the form of a porous plate 3 of active carbon rendered hydrophobic, for example, by the incorporation therein of polystyrene and bearing a conductive collector grid 4 covering the lowermose face of the plate 2, is secured to the bottom of the container 1 by an annular adhesive joint or packing 5. The adhesive preferably utilized is a solution of polystyrene in trichloroethylene. Other suitable adhesives may be used. A packing 6 of epoxy resin is disposed between the peripheral edge surface of the positive electrode and the adjoining lateral wall of the container 1. The positive electrode is covered with a layer of gelled alkaline electrolyte 7, which is, for example, a potassium hydroxide solution to which starch as a gelling agent has been added, this layer being itself covered with a negative electrode in the form of a layer of pulverulent zinc in suspension in a gel analogous to the electrolyte gel.

A cover 9 of the same material as that of container 1 e.g. polystyrene is adhesively secured to the container 1. The cover comprises a central chamber 10 through which a conductor wire 11 extends via an aperture 12 provided in the bottom of the chamber 10. This wire is soldered or otherwise electrically connected to a conductive collector grid 13 disposed on the uppermost surface of negative electrode 8. The chamber 10 is provided with a filling or packing 14, for example, of cast epoxy resin. The electrode 8 and its grid 13 lie below the cover 9 defining an internal space S. A layer 15 of open-pored polyethylene foam or equivalent material substantially fills the space S between the grid 13 and the cover 9. The wire 11 is embedded in the packing 14 and projects outwardly of cover 9.

The wire 16 projects outwardly of the bottom of container 1 via one of the openings 2. Wires 11 and 16 constitute the terminals of the cell. Assembly of the primary cell C is effected in the following manner. A layer of adhesive 5 is deposited in an annular recess G on the peripheral portion of the inner face of the bottom of the container. The positive electrode plate 3 bearing grid 16 and provided with the output wire 16 is then inserted into the container 1 and disposed centrally on the bottom of the container 1 in such manner that the grid 14 bears on the inner face of the bottom, the wire 16 extending through one of the apertures 2. Epoxy resin is then poured about the peripheral portion of the plate 3 to form the packing 6. After hardening or setting of the epoxy resin packing 6, the electrolyte 7 above described is poured into container 1 at a low temperature, preferably below 0°C. at which low temperature its viscosity is sufficiently low to allow it readily to settle and spread out on the upper surface of positive plate 3, in a uniform layer free from bubbles. Then, sufficient heating of the components thus far assembled is effected to cause the viscosity of the electrolyte to increase providing thus the gelled electrolyte layer 7. The layer 7 is then covered with the pulverulent zinc suspension in gel as aforesaid as a paste to a level short of the height of container 1 to form the negative electrode 8 leaving space S above its upper surface. The grid 13, the wire 11, the porous layer 15, the cover 9 and the packing 10 are then positioned successively or as a pre-assembled assembly over the negative electrode 8 and the cover 9 is adhesively secured to the container 1 at M to provide a fluid-tight seal.

Since the container 1 is sealed at M in fluid-tight manner, air needed for activating the cell is only able to penetrate into its interior via the apertures 2. The air is prevented by the packings 5 and 6 from flowing around the positive electrode 3 in order to oxidize the negative electrode 8, the air can only pass through the pores in the positive electrode of active carbon 3, to participate in the electrochemical process of discharge of the primary cell. The efficiency of the packing 5 is particularly good due to the fact that the dry constituent of the adhesive, i.e., the polystyrene, is both the material of the container 1 and also the agent rendering the positive electrode plate or layer 3 hydrophobic, thus establishing structural continuity between these components. The electrolyte 7 is not able to pass through the plate 3 because the latter is hydrophobic, so that it cannot in any way have access to the exterior of the primary cell.

The electrolyte 7, due to the manner in which it has been positioned, mates perfectly at its lower surface with the surface of the electrode 3 upon which it rests. This is favorable to the good functioning of the primary cell.

Figure 4:
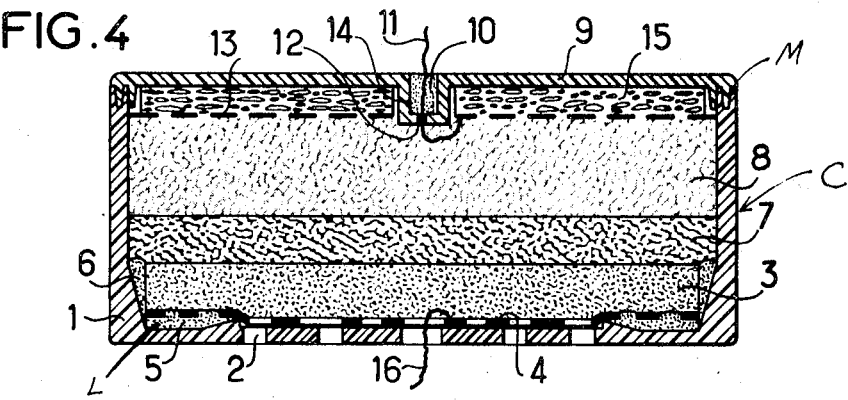

During discharge of the primary cell C, the negative electrode 8 increases in volume. The only direction in which this expansion can occur is toward the layer 15 of foam material which is compressed as shown in FIG. 4. The negative electrode 8 during discharge thus may expand upwardly against the opposition provided by layer 15. Thus, electrode 8 is maintained in the desired state of compression against the electrolyte 7 by the layer 15. Thus, the electrolyte 7 cannot be displaced and there is no risk of short-circuit occurring between the electrodes 3 and 8.

Before being put into use, the primary cell C may be preserved in an air-tight wrapping, or an air-impermeable adhesive sheet may be employed for blocking or closing off of the aperture 2. Either expedient will prevent access to the cell of air via said aperture prior to the time when it is to be put into operating condition. Either the wrapping is removed or the sheet is stripped so that required air may enter the cell via apertures 2.

Figure 2:
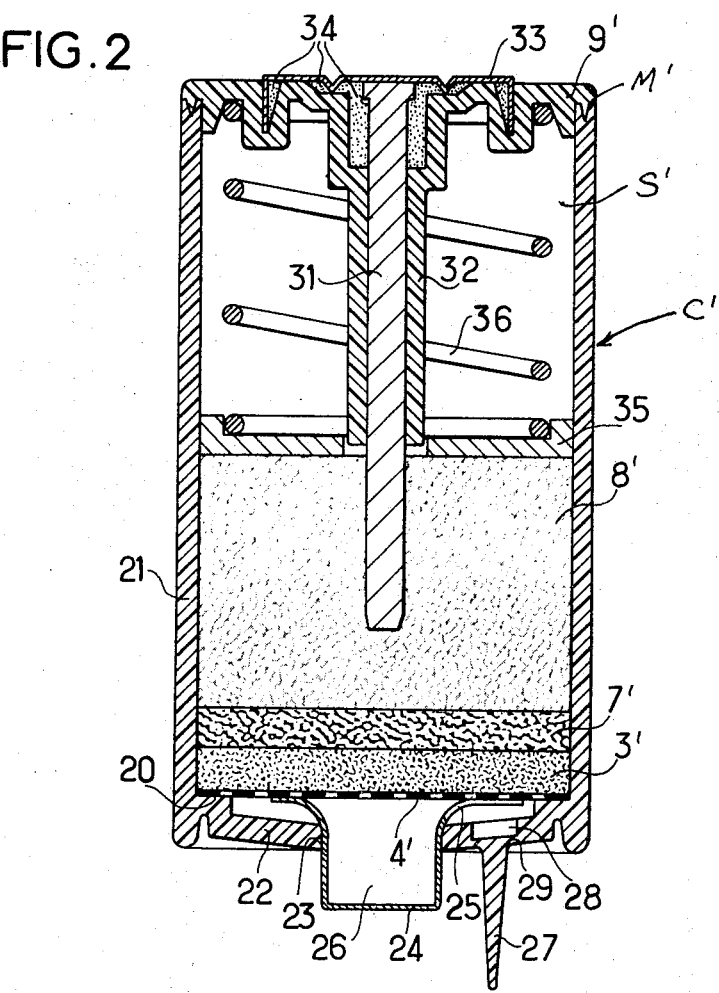

Referring to FIG. 2, the components of primary cell C' which are designated by reference numerals 3', 4', 7' and 8' and 9' have the same characteristics and function in the same manner as the components designated by the same unprimed reference numerals in FIG. 1.

The grid 4' of the positive electrode 3' bears on a shoulder 20 provided within a casing 21, the bottom 22 of which is formed with a central aperture 23. This casing and bottom are of the same material as casing 1 of FIG. 1. A metal cap 24 soldered or otherwise electrically connected to the grid 4' extends through the bottom 22, blocking the aperture 23 therein and constituting the positive terminal of the primary cell C'. An opening 25 is provided in the wall of cap 24 within the primary cell C' between the inner face of said bottom and under face of grid 4'. The bottom 22, the grid 4' and the external portion of the cap 24 delimit a closed chamber 26. The bottom 22 is provided with a blind aperture 28 extending from its inner face and has a projection 27 projecting outwardly of the bottom opposite the aperture, thus defining in the wall of the bottom a thin wall zone 29.

An adhesive packing of adhesive based on polystyrene similar to adhesive layer 5 secures the positive electrode 3' and grid 4' to the shoulder 20 and also to the zone of the wall of the container 21 opposite the peripheral wall of the positive electrode 3'.

A current-collecting rod 31 extending in an axial tubular shaft 32 associated with the cover 9' is engaged in the negative electrode 8'. This rod 31 also makes electrical contact with a metal cup or dish 33 covering the central zone of the cover 9'. The said cup constitutes the negative terminal of the primary cell C'. This space between the cover 9' and the cup 33 is filled with an epoxy packing 34.

A plate 35 is biased against the upper surface of electrode 8' by a helical spring 36 located in space S' with one end bearing on the inner face of the cover 9' and its other end bearing on the plate 35.

Assembly of the primary cell C' is effected in the following manner. A coating of adhesive of the same type as adhesive 5 is applied on the zone of the inner surface of the container 21 which is required to receive and support the positive electrode 3' and grid 4. Then the latter are introduced and secured. The grid 4' is provided with a conductive cap 24 electrically connected thereto. This cap 24 projects through aperture 23 and fits tightly therein. The electrolyte 7' and the electrode 8' are then put into position over positive electrode 3' as in the preceeding example. Then the plate 35 is deposited on the electrode 8' and the spring 36 on the plate.

Independently of these operations, assembly of the cover 9' and of the negative collector rod 31 is effected by first of all soldering or otherwise electrically uniting rod 31 and the cup or dish 33 and then inserting the rod 31 in the shaft 32. Before the cup 33 comes into contact with cover 9' the epoxy resin or equivalent sealant provided for forming the packing 34 is introduced between these two components.

The cover 9' thus equipped is adhesively secured to the container 21.

Figure 5:
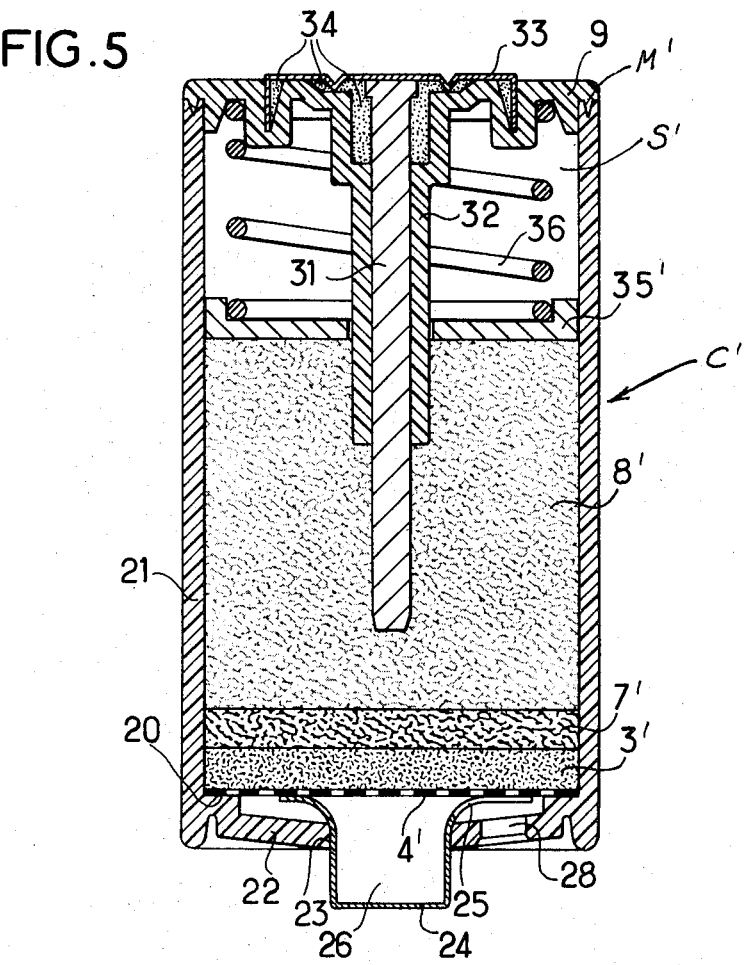

The primary cell C' thus constituted affords no opportunity for the entry of air, so that it may be stored for a long period of time. In order to condition the primary cell C' for operation, inflow of air is permitted by tearing off the projection 27. The wall 29 is then ruptured and the aperture 28 opened to the exterior of said cell C' as shown in FIG. 5. The primary cell is then ready to function under the same conditions in respect of air-tightness and electrolyte-tightness as the primary cell C in FIG. 1.

The packing 34 provides simultaneously for fluid-tightness at the outlet for negative current and for securing by adhesion of the assembly constituted by the rod 31 and the cup 33 on the cover 9'.

When the active negative substance of electrode 8' swells, it urges the plate 33 upwardly in space 8'. This compresses the spring 36, as shown in FIG. 5, in which like reference numerals have been utilized for like components.

Figure 3:
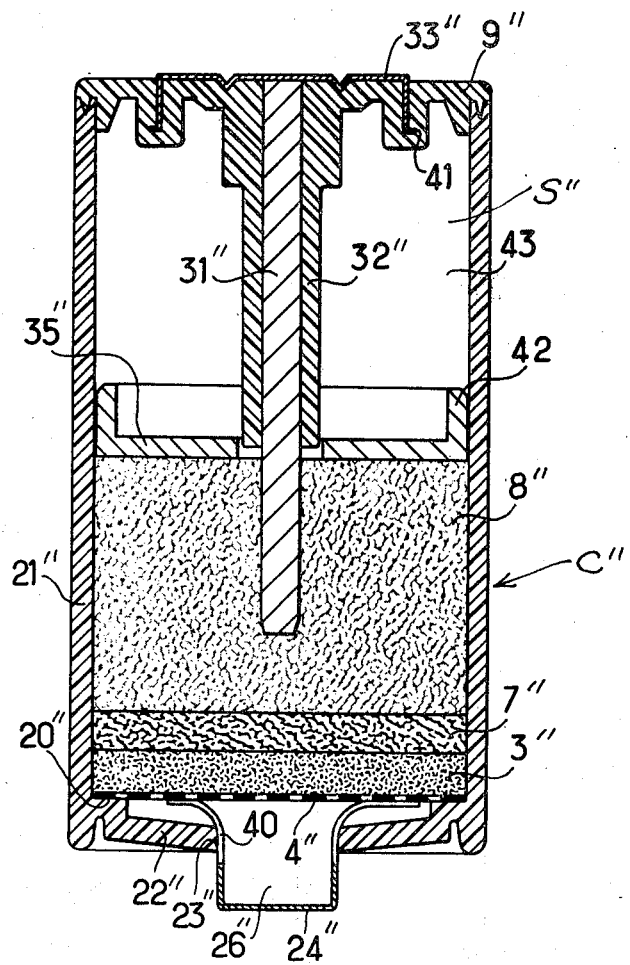

The primary cell C'' shown in FIG. 3 differs from that shown in FIG. 2 due to the following details. The bottom 22'' of the container 21'' does not have either a blind aperture like 28 nor the projection 27 nor a frangible thin wall portion 29. The cap 24'' has an access opening extending from its edge or rim outwardly to the portion outwardly of the bottom 22' and establishes communication between the chamber 26'' and the cell exterior. The cup 33'' has a flange 41 extending substantially perpendicular to the axis of the primary cell and the cover 9'' is molded around the assembly constituted by the rod 31'' and the cup 33''. The plate 35'' has a peripheral edge 42 extending parallel to the inner wall of the container 21'' and serves a piston that slides frictionally in the container 21''. The compartment 43 of the casing limited by the cover 9'' and by the plate 35'', is empty.

The cover 9'' may be produced by injection molding about the rod 31'' and the cup 33'' which have previously been soldered or otherwise united.

Referring to the primary cell C'' shown in FIG. 3, inflow of air is possible via the access opening 40 in the cap 24'', without it being necessary to open a passage for putting the cell C'' into operation. This primary cell C'' is thus preferably preserved or stored before utilization, in a fluid-tight wrapping, for example in a pouch made of welded polyethylene. Fluid tightness at the negative current outlet or terminal and also securement of the rod 31'' and the cup 33'' are effected as by the molding of these elements into the cover 9''.

On swelling of the negative active material of negative electrode 8'' at discharge, the plate 35'' is displaced towards the cover 9'''. The resistance due to friction between the peripheral rim 42 and the container 21'' ensures maintenance of the negative electrode 8'' in the desired state of compression during use.

It is apparent that the arrangement described in the three examples could, within the framework of the invention, be combined in different ways. In particular, in the primary cell C shown in FIG. 1, the porous layer 15 may be replaced by a plate similar to 35 and a spring similar to 36, or by a piston provided with a rim similar to rim 42. Conversely, a compressible layer similar to 15 could be utilized, in replacement of a compression means 36 or 42 provided in the primary cells C' and C'' shown in FIGS. 2 and 3. Similarly, the aperture 28 of FIG. 2 could be combined with the molded-on cover 9'' of FIG. 3, or the apertures 40 of FIG. 3 with the packing 34 of FIG. 2.

It is to be understood that the invention is not limited to the embodiments described and illustrated, which have been presented solely by way of example. In particular, it would be possible within the scope of the appended claims to introduce modifications as to detail, to change some arrangements or to replace some means by equivalent means. Notably, in a primary cell C' as shown in FIG. 2, it would be possible to replace the blind aperture 28 and the projection 27 by an aperture extending entirely through the bottom 22 and providing a removable plug or stopper for closing off of said aperture, whereby it would become possible to alternate periods of preservation and periods of functioning, simply by removing or reinsertion of such a plug or stopper.

It is also possible to replace the polystyrene by a synthetic material having similar properties, such as polymethacrylate.

There is no intention, therefore, of limitation of the invention to the exact details hereinbefore presented.

What is claimed is:

1. An air depolarization unitary primary cell of the type comprising a tubular casing of non-conductive material, a porous positive electrode, an immobilized alkaline electrolyte and an expandible negative electrode based on zinc arranged in superposed layers and disposed in said tubular casing, all of said layers extending transversely of the longitudinal axis of said casing, means for sealing said cell in fluid-tight manner relative to liquids within the cell at one end thereof, said means comprising a hydrophobic impregnant in pores of said positive electrode, said positive electrode being adhesively secured in said container adjacent said one end, said one end having at least one opening for providing access of air to the positive electrode while blocking exit of said liquids via said positive electrode, means at the opposite end of said casing including a cover carrying a negative terminal, means connecting said terminal with said negative electrode, said cover being securely sealed to said casing at said opposite end, said layers being disposed in said casing to provide a space for expansion of the negative electrode between the latter and the cover, means within said space between said cover and said negative electrode to maintain said layers under pressure and in intimate surface contact irrespective of expansion of the negative electrode during use of the cell.

2. Primary cell according to claim 1, wherein said last-named means comprises a compressible porous layer of material in said space and extending transversely of the axis of said casing which resists attack by electrolyte.

3. Primary cell according to claim 2, wherein said material is a synthetic material.

4. Primary cell according to claim 1, wherein said last-named means comprises a plate-like member in surface contact with the negative electrode and a spring in said space between said plate-like member and said cover for biasing said plate-like member into such contact.

5. Primary cell according to claim 1, wherein said last-named means comprises a piston extending transversely of the axis of said casing and frictionally slidable in the casing and in surface contact with said negative electrode.

6. Primary cell according to claim 1 wherein said negative electrode comprises a layer of pulverulent zinc in suspension in a gel.

7. Primary cell according to claim 1 wherein the electrolyte is a solution of potassium hydroxide mixed with a gelling agent.

8. Primary cell according to claim 1 wherein said positive electrode comprises a hydrophobic porous plate adhesively secured at its periphery to the casing.

9. Primary cell according to claim 8, wherein the pores of an impregnant of porous plate are rendered hydrophobic by the material similar to that of the casing, and wherein the adhesive securing said plate to the casing contains like material.

10. Primary cell according to claim 9 wherein the said material is selected from the group consisting of polystyrene and polymethacrylate.

11. Primary cell according to claim 1 including a negative terminal at said cover prolonged towards the interior of the casing through which said terminal extends, a fluid-tight packing, and a current collector in contact with the negative electrode and connected to said terminal.

12. Primary cell according to claim 11 wherein said negative terminal is electrically connected with said current collector contacting the negative electrode.

13. Primary cell according to claim 11 wherein the collector projects from the inner face of the cover and is engaged in the negative electrode.

14. Primary cell according to claim 12 wherein the collector comprises a plate disposed between the negative electrode and an expansion space in said cell.

15. Process for the manufacture of an air depolarization primary cell comprising providing a tubular container having a ledge adjacent one end, applying adhesive to said ledge then placing a positive hydrophobic porous electrode in position on said ledge of said container so as to extend transversely of the axis of said container and to be secured to said ledge by said adhesive, then applying a settable resinous packing between the periphery of said porous positive electrode and the inner wall of said container, allowing said packing to set and harden, then pouring a gellatinized electrolyte on the positive electrode to form a layer extending transversely of the axis of said casing, then covering said electrolyte layer with a negative electrode also extending transversely of the axis of the container, then providing compressible means in said casing overlying said negative electrode to maintain pressure contact between the electrodes and the electrolyte irrespective of the expansion of the negative electrode, then assembling a cover with the container in fluid tight manner and spaced from said negative electrode thus defining an expansion space therebetween in which said compressible means is confined.

16. Process for the manufacture of an air depolarization primary cell according to claim 15 wherein first the positive electrode is disposed and positioned in said container, then the electrolyte is poured on to the positive electrode, then covering the electrolyte by the said negative electrode, then inserting means for maintaining a state of compression of said negative electrode, and finally the assembling cover in fluid-tight manner with said container.

17. Process according to claim 15 wherein before introducing the positive electrode into said casing adhesive is applied to a zone of the inner surface of the container with which said positive electrode will make contact.

18. Process according to claim 15 wherein the electrolyte is poured onto said positive electrode at a temperature lower than ambient temperature, but whose viscosity is sufficiently low to permit it to settle on said positive electrode and spread out thereover in a uniform layer free of bubbles which extends transversely of the axis of said container.

19. Process according to claim 18, wherein the said temperature is lower than 0°C.

20. An air depolarization primary cell of the type comprising a tubular casing of synthetic nonconductive material, a positive electrode, an immobilized alkaline electrolyte and an expandible negative electrode arranged in superposed layers all disposed transversely of the axis of said casing, a cover spaced from the negative electrode layer and closing one end of the casing, yieldable means for maintaining said negative electrode in a state of compression and in pressure contact with said electrolyte irrespective of expansion of said negative electrode, said means being located in the space within said casing between the negative electrode and said cover, a terminal in said cover, means for connecting said terminal to said negative electrode, means for providing a fluid-tight seal between said cover and said container, said positive electrode being porous and hydrophobic, means for admitting air to said casing only via pores of said positive electrode, and adhesive means for preventing displacement of said positive electrode within said casing during use of said cell and any resultant expansion of said negative electrode.

21. Primary cell according to claim 20 wherein said negative electrode comprises pulverulent zinc in suspension in a gel.

22. Primary cell according to claim 20 wherein said positive electrode is of active carbon rendered hydrophobic.

23. Primary cell according to claim 20 wherein said alkaline electrolyte is a solution of potassium hydroxide mixed with a gelling agent.

* * * * *